July 13, 1965     C. E. WINTER     3,194,367

CLUTCH AND BRAKE

Filed April 16, 1963

INVENTOR.
CARL E. WINTER
BY *Elliott & Pastoriza*
ATTORNEYS

United States Patent Office 3,194,367
Patented July 13, 1965

3,194,367
CLUTCH AND BRAKE
Carl E. Winter, 10514 Kinnard Ave., Los Angeles, Calif.
Filed Apr. 16, 1963, Ser. No. 273,371
2 Claims. (Cl. 192—18)

This invention relates generally to clutches which may be either manually or electrically controlled and, more particularly, to an improved mechanical clutch apparatus for imparting rotation from an input shaft to an output shaft when in a first clutching position and for either braking or permitting free independent motion of the output shaft when in unclutched position.

Many conventional clutches operate on the simple principle of moving two friction surfaces into clutching engagement with each other to transfer motion from one clutch surface to the other. If a large driving torque is provided on one of the surfaces to rotate the other surface, slippage may result if the turning torque exceeds the friction force as determined by the coefficient of friction between the engaging surfaces themselves. This coefficient of friction is a function of the normal force pressing the surfaces together. To provide a large normal force requires heavy springs or the like and, as a consequence, it is not always easy to separate the surfaces when it is desired to release the clutch. In other words, to accommodate large torques results in a mechanism in which declutching or separation of the surfaces may require complicated apparatus.

It should also be understood with the foregoing types of clutches that the force normally applied between the surfaces to urge them into pressing engagement is constant. Thus torques only up to a certain limit may be transmitted through the clutch mechanism. It would be desirable if the normal or pressing engagement force between the clutch surfaces could automatically be increased with increasing torque to insure against any slippage between the clutch surfaces.

With all of the foregoing in mind, it is a primary object of this invention to provide an improved clutch apparatus in which extremely large torques may be transmitted between first and second rotating members when the clutch surfaces are in engagement and yet, in which very little energy is required to separate the clutch surfaces.

More particularly, it is an object to provide an improved clutch apparatus in which the normal force pressing two clutch surfaces together is automatically increased with increased torque to the end that extremely large torques may be transmitted without slippage.

Another object is to provide an improved clutch apparatus which may also conveniently include a braking feature to the end that when the clutch surfaces are separated, the driven clutch member may be braked to a stationary position.

Other objects of this invention are to provide an improved clutch apparatus which may be either manually or electrically operated with very little energy, which is compact in size, extremely reliable in operation and in which the input and output shafts therefor are in axial alignment so that the clutching apparatus may be conveniently inserted in any particular mechanism as a substitute for an elongated shaft between the ends of which a clutch or release function is desired.

Briefly, these and many other objects and advantages of this invention are attained by providing a casing structure supporting an input rotatable shaft and an output rotatable shaft in axial alignment. The inner end of the output rotatable shaft includes spiral threads upon which is threadedly mounted a clutch collar. This clutch collar includes a clutch surface facing in an axial direction towards the inner end of the input shaft. This inner end of the input shaft in turn terminates in an annular clutch member juxtaposed the clutch surface on the clutch collar. The arrangement is such that the clutch collar may be threaded axially along the output shaft towards the clutch member to effect engagement therewith. Once engagement is achieved, the clutch member on the input shaft will tend to rotate the clutch collar relative to the output shaft resulting in a further threading of the clutch collar in a direction towards the clutch member thereby effecting a tighter engagement between the clutch surfaces.

When further axial movement of the clutch collar is prevented, the clutch collar will be locked against rotation to the output shaft so that the output shaft will be forced to turn with the input shaft and the desired clutch action is achieved. Because of the mounting of the clutch collar in a spiral thread on the output shaft, it will be evident that the greater the input turning torque, the greater will be the tendency of the clutch collar to move closer to the clutch member and thus effect a tighter clutching action so that increased torque merely results in an increased pressing engagement and thus substantially no slippage is possible.

When it is desired to release the surfaces, the clutch collar itself need only be retracted or pulled away from the clutch member. Once the clutch surfaces are disengaged, the inertia of the output shaft rotating within the clutch collar will result in the threads turning such as to back off the clutch collar so that once disengagement is achieved, substantially no energy is needed to separate the surfaces.

In accordance with further features of the invention, a brake surface may be juxtaposed the opposite end of the clutch collar so that when the clutch collar is backed off, this opposite end will be brought into engagement with the brake surface. As a result, further axial movement of the clutch collar is blocked so that relative rotation between the clutch collar and output shaft is prevented and the output shaft will be braked to a stationary position.

A better understanding of the invention will be had by now referring to a preferred embodiment thereof as illustrated in the accompanying drawings, in which.

Figure 1:
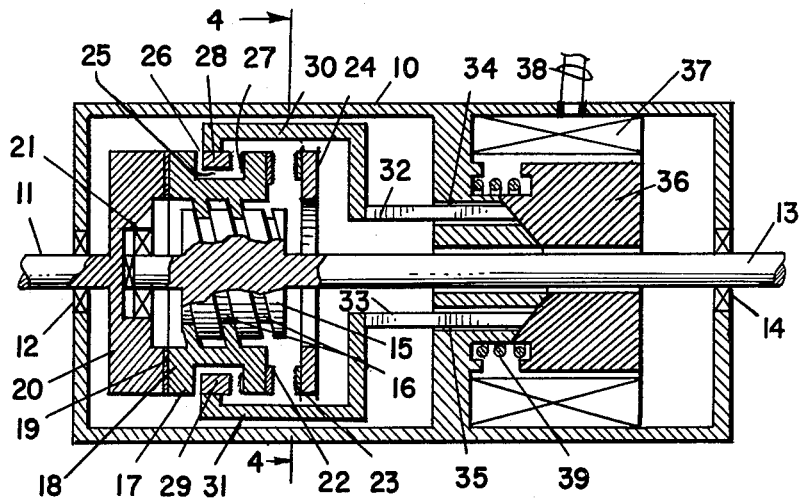
FIGURE 1 is a partial elevational cross-section showing some portions in full lines and some portions cut away of the clutch apparatus when in clutching engagement for transmitting motion between an input and output shaft.

Referring first to FIGURE 1, there is shown a casing 10 having an input shaft 11 extending into the left end of the casing and rotatably mounted thereto as by bearings 12. An output shaft 13, in turn, extends into the right hand or opposite end of the casing and is rotatably supported by bearings 14. The inner end of the output shaft 13 includes an enlarged diameter portion 15 provided with spiral threads 16. Preferably, the spiral threads 16 are of relatively large pitch and serve to threadedly mount a clutch collar 17.

Figure 2:
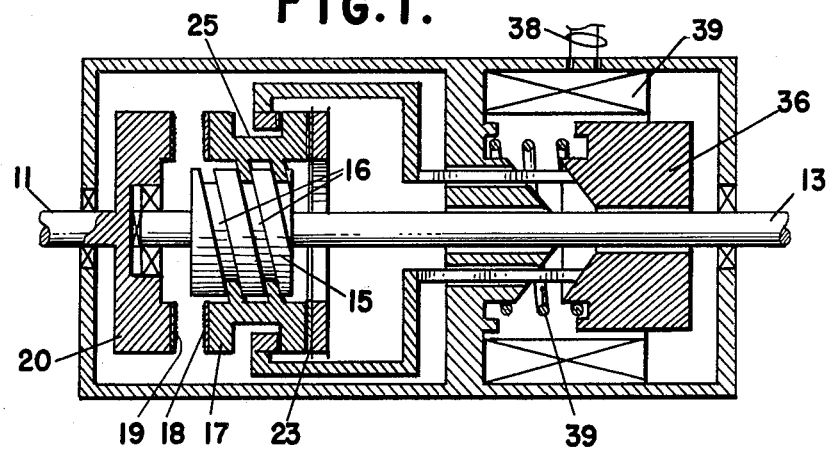
FIGURE 2 is similar to FIGURE 1 but illustrates the relative positions of movable components in the apparatus when the clutch is out of engagement so that the input shaft may turn independently of the output shaft.

As shown best in both FIGURES 1 and 2, the clutch collar 17 includes a first clutch surface 18 annularly extending about the left hand face thereof. This clutch surface 18 is juxtaposed a second clutch surface 19 on a clutch member 20 similarly extending annularly about the axis of the shafts. The clutch member 20 may be secured to or form an integral part of the input shaft 11 as indicated by the cross-sectioning. In this respect, the clutch member 20 is rotatable with the input shaft 11 and includes a central cutout portion for supporting bearings 21 journaling the end of the output shaft 13. By this arrangement, the input and output shafts are held in axial alignment and yet may rotate independently of each other when the clutch surfaces 18 and 19 are out of engagement.

In a preferred embodiment of the invention, the clutch collar 17 may also include an annular clutch surface 22 on its opposite end juxtaposed a brake surface 23 on a stationary brake 24. The brake 24 is secured to the inside of the casing 10 as will be described subsequently.

With the clutch collar 17 in threaded engagement with the spiral threads 16, it will be clear that threading or rotational movement of the collar 17 about the enlarged portion 15 will result in axial movement of this clutch collar. It will also be evident that if axial movement of the clutch collar 17 is blocked, the enlarged portion 15 and shaft 13 will be forced to rotate with the clutch collar if a rotation is imparted thereto.

With the foregoing in mind, it will be evident that if the clutch collar 17 is moved in an axial direction towards the clutch member 20, as soon as engagement between the clutch surfaces 18 and 19 take place, any rotation of the clutch member 20 will be imparted to the clutch collar 17 and this rotation, if assumed to be in a counter-clockwise direction as viewed from the left end of the input shaft 11 in FIGURE 1, will tend to thread the clutch collar 17 further towards the clutch member 20 thereby effecting a tighter engagement. When further axial movement of the clutch collar 17 to the left as viewed in FIGURE 1 is blocked, the threaded connection with the enlarged diameter portion 15 of the output shaft 13 will "bind" and thus the output shaft 13 will be caused to rotate with the clutch collar 17.

If now the clutch collar 17 is moved to the right or away from the clutch member 20, and during such movement away from the clutch member 20, the clutch collar 17 is slowed or stopped from rotating, the rotational inertia of the output shaft 13 and enlarged diameter portion 15 will move the spiral threads 16 in a direction such as to aid in moving the clutch collar 17 to the right or away from the clutch member 20. In fact, this movement of the clutch collar 17 to the right will take place until its opposite clutch surface 22 engages the brake surface 23 and thus prevents further axial movement of the clutch collar to the right. When this further axial movement is blocked, it is no longer possible for the shaft 23 to rotate as a consequence of "the binding" of the threads and thus the output shaft 13 will be braked.

In order to effect the foregoing movement of the clutch member, an actuating means is provided. In accordance with the preferred embodiment of the invention, this actuating means cooperates with an annular exterior channel 25 circumscribed about the clutch collar 17. As shown, this channel includes opposite opposed walls 26 and 27. The wall 26 is smooth and the wall 27 is provided with a clutch surface as indicated in FIGURES 1 and 2. The actuating means itself includes fingers 28 and 29 arranged to be received in diametrically opposite portions of the annular channel 25. These fingers are carried on the ends of arms 30 and 31 in turn connected to rods 32 and 33 passing through bores 34 and 35 to a solenoid plunger 36 shown in the right hand portion of the casing 10 in both FIGURES 1 and 2.

Cooperating with the solenoid plunger 36 are solenoid coils 37 surrounding the plunger and arranged upon energization to move the plunger to the left or further into the center portion of the coils 37. Energization of these coils 37 may be effected through suitable input leads 38 from a remote station. A return solenoid spring 39 is provided to move the plunger 36 to the right when the coils 37 are de-energized. Thus, the fingers 28 and 29 may be moved from engagement with one of the channel walls to engagement with the other by actuation of the solenoid structure as described.

Figure 3:
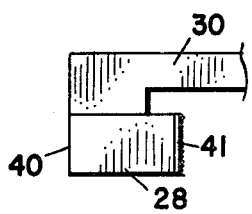
FIGURE 3 is an enlarged fragmentary view of an actuating portion of the clutch apparatus illustrated in FIGURES 1 and 2; and, FIGURE 4 is a cross-section taken in the direction of the arrows 4—4 of FIGURE 1.

With particular reference to FIGURE 3, the finger 28 is shown in enlarged view wherein it will be noted that it includes opposite surfaces 40 and 41 for respective engagement with the walls 26 and 27 in the channel 25 of the clutch collar 17. As shown, the wall 40 is smooth, whereas the wall 41 is rough to provide a clutch surface.

Figure 4:
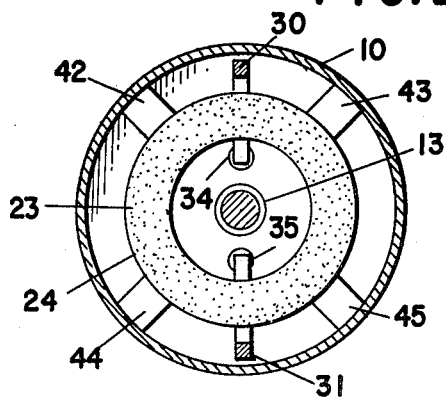

FIGURE 4 illustrates the manner in which the brake surface 23 is supported. As shown, suitable struts or equivalent members 42, 43, 44 and 45 may be provided to hold the brake surface 23 in a stationary position to the casing. It will also be evident from FIGURE 4 that the arms 30 and 31 for the clutch fingers are rotationally stationary but may move back and forth in a direction normal to the drawing of FIGURE 4 within the bores 34 and 35 when the solenoid plunger 36 is actuated and released.

With the foregoing description of the various components in mind, the operation of the improved clutch apparatus of this invention will now be described. Assume first that the input shaft 11 shown in FIGURE 1 is rotated in a counter-clockwise direction as viewed from the left looking towards the casing 10. Assume also that an electrical signal has been applied to the solenoid coils 37 so that the plunger 36 is moved to its extreme leftward position. In this position, the arms 30 and 31 will have moved the fingers 28 and 29 so that the smooth walled portions will engage the smooth wall 26 in the annular channel 25 in the clutch collar 17. The clutch collar 17 will thus be urged axially along the enlarged diameter spiral portion 15 of the output shaft 13 and this axial movement will result in rotation of the clutch collar 17 as it threads along this enlarged portion. When the clutch collar surface 18 engages the clutch member surface 19 as illustrated in FIGURE 1, the clutch collar 17 will be driven in a counter-clockwise direction as viewed from the left looking towards the right and, as described heretofore, this imparted motion to the clutch collar 17 will tend to further effect an axial movement towards the clutch member 20 because of the direction of the spiral threads 16. When further axial movement of the clutch member 17 is prevented, the enlarged diameter portion 15 and output shaft 13 will be caused to rotate through the medium of the threaded connection of the clutch collar to the spiral threads and thus the shafts 11 and 13 will rotate in unison.

It should be clearly understood that very little energy is required of the solenoid to move the fingers to drive the clutch collar 17 towards the clutch member 20, and that once engagement of the clutch collar 17 is made with the clutch member 20, the further threading action as described will move the clutch collar 17 slightly further axially in a leftward direction until the channel surface 26 is free of the end surface of the fingers 28. The plunger 36 is stopped against further leftward movement by abutment of the plunger against the outlet of the bores 34 and 35, so that the fingers 28 and 29 will actually be out of contact with the wall surface 26 after the initial clutching engagement has been effected. The clutch collar 17 provides its own pressing force as a consequence of the thread structure as described.

It is to be understood accordingly that the clutch collar 17 will rotate with the clutch member 20 without engagement with any other elements and the shaft 13 will also rotate in unison with the clutch collar 17. Any large torque applied to the output shaft 13 tending to slow this shaft relative to the rotation of the input shaft 11 will simply result in the spiral grooves 16 camming the clutch collar 17 into closer engagement with the clutch member 20 thereby increasing the frictional force between the engaging surfaces so that the torque will be accommodated without slippage.

The clutch members will remain in engagement so long as the signal is applied to the coils 37 to hold the plunger 36 in its leftward position against the bias of the spring 39. When it is desired to declutch or separate rotation of the shaft 11 from the output shaft 13, the signal to the coils 37 is terminated so that the spring 39 will then urge the plunger 36 to the right. This action will result in movement of the fingers 28 and 29 to the right through the medium of the supporting arms 30 and 31, to in turn urge the collar 17 away from the clutch member 20.

The above situation is depicted in FIGURE 2 where it will be noticed that the clutch surface 41 of the fingers 28 and 29 has engaged the opposite wall surface 27 of the channel 25 so as to slow rotation of the collar 17. When the rotation of the collar 17 is slowed relative to the rotation of the output shaft 13, the inertia of the rotation of the output shaft 13 will result in the spiral threads rotating relative to the clutch collar tending to threadedly back off the collar further in a direction to the right or away from the clutch member 20. Thus, again, very little force is required of the solenoid spring 39 in urging the clutch collar 17 away from the clutch member 20.

In order to brake or stop completely rotation of the output shaft 13, continued movement of the clutch collar 17 to the right will finally result in its opposite clutch surface 22 engaging the brake surface 23 so that further axial movement of the collar is prevented. The continued inertia of rotation of the output shaft 13, however, will tend to threadedly move the clutch collar 17 into tighter engagement with the brake surface 23 so that immediate braking of the output shaft 13 will be effected as soon as the collar is prevented from further axial movement to the right by the brake surface.

Accordingly, when the components assume the positions illustrated in FIGURE 2, the input shaft 11 is free to rotate independently of the output shaft 13 and the output shaft 13 is held stationary.

If it is again desired to couple the input shaft to the output shaft, the solenoid is simply energized and the fingers 28 and 29 will operate to move the collar towards the clutch member 20 and the sequence of clutching operations will be repeated.

From the foregoing description, it will thus be evident that the present invention has provided a greatly improved clutch apparatus. Not only is the device compact and rugged in design having an input and output shaft in axial alignment, but the more important feature of being able to transmit large torques by providing a clutch engagement force dependent upon the torque in question enables a very positive and reliable clutching action to be realized. Moreover, as a consequence, of this clutching arrangement, very little energy is required to actuate the clutch into clutching engagement or release the clutch from clutching engagement.

While only one preferred embodiment of the invention has been shown and described, various changes and modifications that fall clearly within the scope and spirit of the invention will occur to those skilled in the art. The clutch apparatus is therefore not to be thought of as limited to the one embodiment set forth merely for illustrative purposes.

What is claimed is:

1. A clutch apparatus comprising, in combination: a casing; an input shaft extending into one end of said casing; an output shaft in axial alignment with said input shaft extending from the opposite end of said casing, said output shaft terminating within said casing in an enlarged diameter portion having spiral threads thereon; a clutch collar threaded to said enlarged diameter portion and including a first clutch surface facing in an axial direction towards said input shaft, said input shaft terminating in said casing in an annular clutch member having a second clutch surface juxtaposed said first clutch surface, said clutch collar including an annular channel circumscribed about its mid-portion and having opposed walls; finger means receivable in said channel; solenoid means for moving said finger means against one of said walls to urge said clutch collar into engagement with said clutch member upon energization of said solenoid means; spring means for moving said finger means against the opposite of said one of said walls to move said clutch collar out of engagement with said clutch member, the direction of said spiral threads being such that rotation of said input shaft tends to thread said clutch collar in a direction into tighter engagement with said clutch member when in clutching engagement therewith; and a brake surface secured within said casing in a position to engage the opposite end of said clutch collar when said clutch collar is moved away from said clutch member whereby said output shaft is braked against rotation by said brake surface through the medium of said clutch collar and said spiral threads.

2. A clutch apparatus according to claim 1, in which the engaging surfaces of said finger means and one wall are smooth so that slipping therebetween can take place with a minimum of friction, and in which the engaging surfaces of said finger means and opposite wall are rough to provide clutch surfaces so that rotation of said clutch collar is initially braked by said finger means when said clutch collar is moved away from said clutch member and towards said brake surface.

References Cited by the Examiner

UNITED STATES PATENTS

| Re. 21,017 | 2/39 | Mellon | 192—18 XR |
|---|---|---|---|
| 774,850 | 11/04 | Mayer | 192—16 |
| 1,480,239 | 1/24 | Chaplin | 192—35 |
| 1,930,290 | 10/33 | Stresau | 192—12 XR |
| 1,978,975 | 10/34 | Winans | 192—35 |
| 2,976,974 | 3/61 | Blyth | 192—54 XR |
| 3,049,209 | 8/62 | Reece | 192—35 XR |

FOREIGN PATENTS 525,481   8/40   Great Britain.

DAVID J. WILLIAMOWSKY, *Primary Examiner.*